United States Patent Office 2,927,070
Patented Mar. 1, 1960

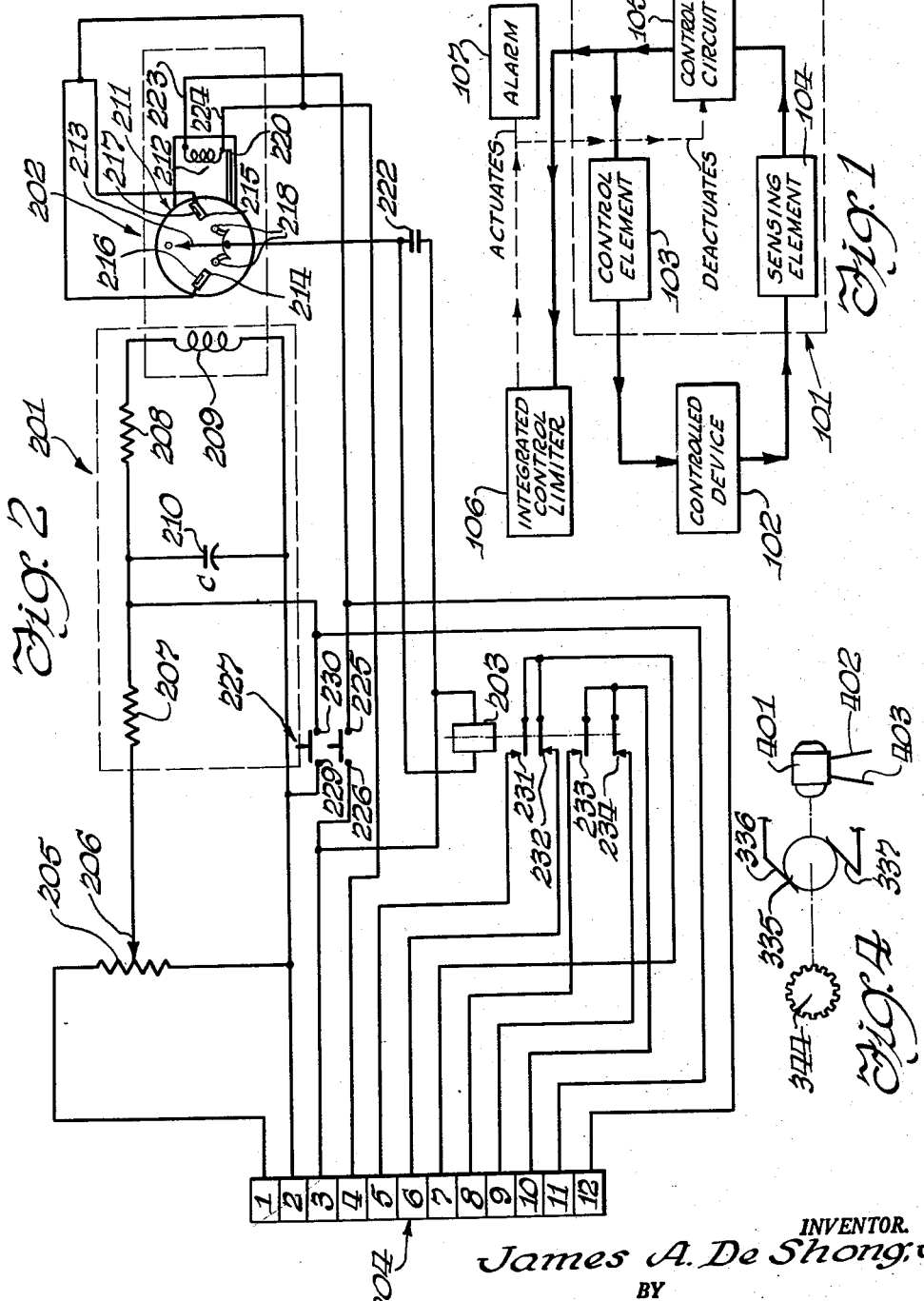

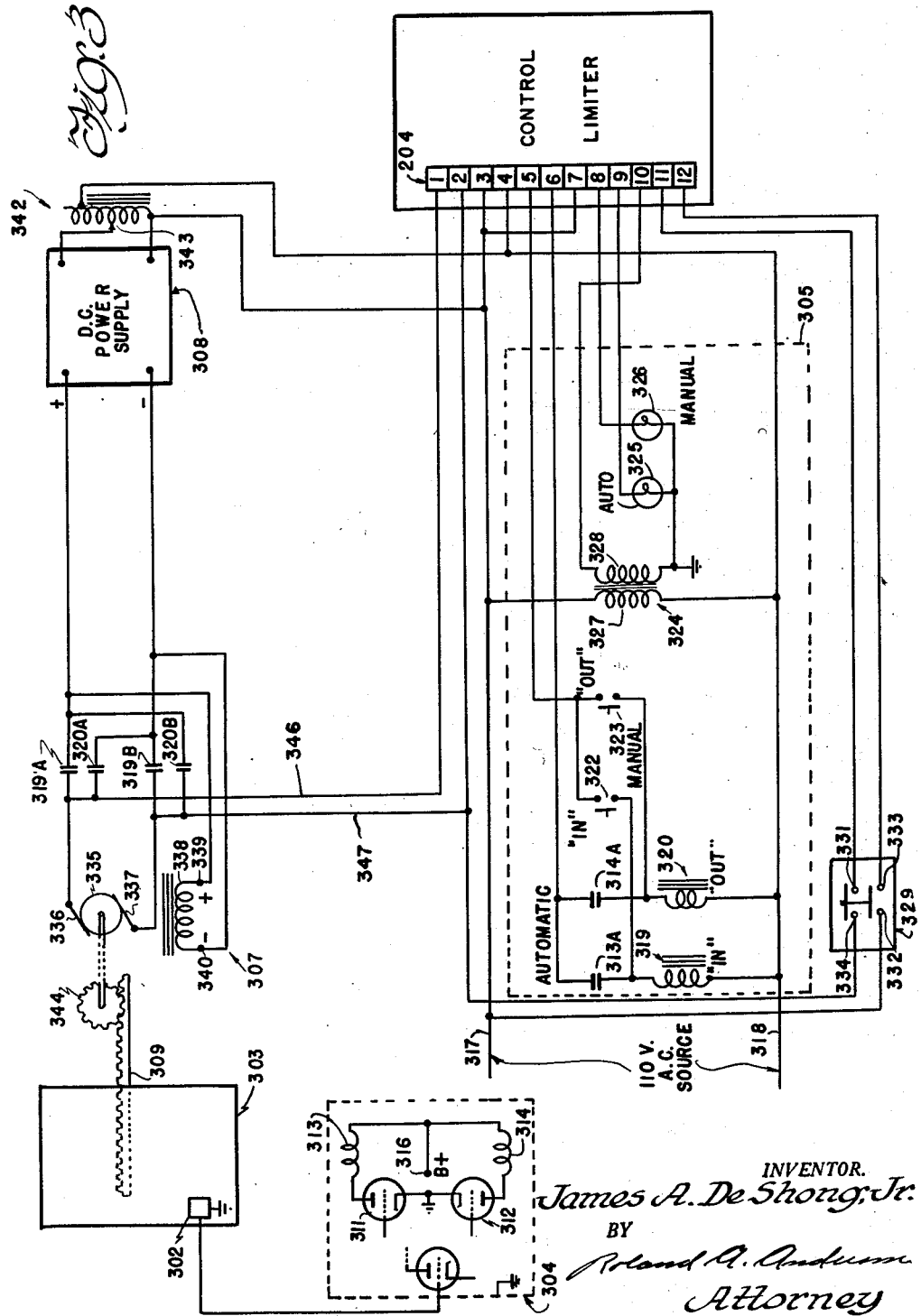

2,927,070

CONTROL LIMITER DEVICE

James A. De Shong, Jr., Elmhurst, Ill., assignor to the United States of America as represented by the United States Atomic Energy Commission Application August 19, 1955, Serial No. 529,595

3 Claims. (Cl. 204—193.2)

The present invention relates generally to electrical devices, and in particular to electrical devices which may be used for controlling the automatic operation of neutronic reactors.

The term "control," as it is applied to a nuclear reactor, refers to devices for changing reactivity and regulating reactor neutron density or power. The control ed variable is $k$ or $\delta k$ wherein $k$ is equal to t..e thermal-energy neutrons produced per thermal neutron absorbed in the reactor and $\delta k$ is equal to thermal-energy neutrons produced per thermal neutron absorbed in the reactor minus one or $(k-1)$. The control of a nuclear reactor is commonly achieved by the use of a control element made of neutron absorbing material, such as boron, which element is inserted into an active portion (neutron producing region) of the reactor. The power output of the nuclear reactor is controlled by adjusting the position of the control element in the active portion of the reactor and by observing the changes in average neutron density indicated by neutron sensitive instruments which have been calibrated in term of reactor power (shown by coo ant temperature rise and flow rate). During all of the phases of operation of the nuclear reactor, protective electrical circuits supervise the operation and limit the rate of change of neutron flux and its magnitude to preset safe values. The reactor is usually brought up manually during a start-up period by an operator, and after it reaches the desired operating level, automatic ci.cuits are switched in by the operator to take over the control of maintaining the power output of the reactor at the preset value. Occasionally, the automatic circuits controlling the operation of the reactor ma,function and cause the reactivity to approach an excessive value with the result that the protective electrical circuits take over and shut down or "scram" the reactor. The disadvantages of a "scrammed" reactor are well known in the art and will not be discussed herein. It is apparent that if t..e malfunctioning of the automatic circuits is detected prior to the approach to the excessive value, the automatic circuits are immobilized to prevent further increase in reactivity, and the operation of the reactor is transferred to manual control, the "false scrams" of the reactor can be elimiated entirely.

It is therefore the object of the present invention to provide a device for limiting the integrated amount of increase in nuclear reactivity occurring over a time interval during an automatic operation of a neutronic reactor and to render inoperative the automatic circuits affecting said operation whenever the integrated increase in reactivity during such interval exceeds a predetermined value and therefore avoid the operation of the protective system designed to shut down the reactor during abnormal operation.

Another object of the invention is to provide a device for limiting the integrated amount of control exerted by an automatic control circuit operating an apparatus over a time interval and to transfer the operation from automatic control to manual control whenever the integrated amount of control exerted by said automatic control circuit during such time interval exceeds a preset value.

A further object of the invention is to provide a control device which is economical to build and is reliable in operation.

The foregoing, and other objects and advantages of the invention, will become apparent from a consideration of the specification and the accompanying drawing, wherein:

Fig. 1 is a simplified schematic diagram showing in block form a control system used for controlling the operation of a controlled apparatus and the disposition of the control limiting device in said system for limiting the operation thereof;

Fig. 2 is a schematic circuit diagram of the control limiting device constructed in accordance with the teachings of this invention;

Fig. 3 is a schematic diagram of an automatic control system, including the control limiting device, useful for operating a nuclear reactor at predetermined power settings; and Fig. 4 is a fragment of the automatic control circuit shown in Fig. 3, which circuit has been modified to provide a different output for actuating the control limiting device.

In accordance with the teachings of this invention, a control limiting device is provided for monitoring a control system used for controlling the operation of a con-troled apparatus. The automatic control system comprises a condition-sensing device, a condition-varying device exerting a control over the condition, and a control means to actuate the condition-varying device. A control limiting device integrates the total movement or cther change of the condition-varying device over any interval of time during a continuum of overlapping periods of time, and if said total movement or change of the condition-varying device over such interval of time during said continuum of overlapping periods of time exceeds a preset value, the control limiting device will respond and switch the control of the operated apparatus from automatic to manual control.

The device described hereinafter, called a control limiter, may be used generally for limiting the amount of control exerted during automatic operation of an apparatus, such as machinery used in manufacturing processes, and particularly for limiting the amount of control exerted by circuits which are used for operating certain types of neutronic reactors which are controllable by actuation of control elements within their active portions. It is well known to those skilled in the nuclear energy art that various types of reactors are controlled by means of control elements which are inserted into the active portions of the reactors to control the release of neutrons, thereby controlling the power output of said reactors. There are available at the present time numerous publications describing the construction and operation of these types of reactors. For a specific type of a reactor wherein the control limiter may be used, reference may be had to "Nucleonics," vol. 12, No. 7, p. 11 (1954), wherein a liquid-metal fuel reactor is described. Also, reference may be had to the neutronic reactor (the solid moderator type) described by E. Fermi et al. in Patent No. 2,708,656 issued on May 17, 1955, wherein the control limiter may be used in conjunction with the regulating rod illustrated in Fig. 20 of said patent.

It is well known that the rate of withdrawal of the control elements out of the active portion of a reactor has to follow an operational method which complies with certain safety standards which were set up to protect the personnel operating nuclear reactors and also to protect the equipment itself. Nuclear reactors are protected from damage by a system of electrical interlocks, sensing elements, relays, and instruments. As is well known in the neutronic art, when the effective multiplication factor, $k$, is equal to 1.0073, for a graphite-moderated reactor utilizing U-235 as fissionable material, the condition of the reactor is described as "prompt critical," since the nuclear fission chain can be maintained by means of the prompt neutrons alone. If the multiplication factor, $k$, exceeds this value, multiplication of the neutrons will occur due to the prompt neutrons alone, irrespective of those delayed, and the neutron density will increase rapidly from the commencement of the operation. In this condition, the reactor is out of control and this accordingly presents a hazard which must be avoided. As indicated before, these hazards are forestalled by the use of the aforesaid protective system. It is desirable, however, to have the protective system operate only when there is something wrong in the reactor operation but to forestall the operation of said protective system for malfunctions occurring in the automatic control system itself. For example, if the malfunction occurs in a circuit controlling automatically the operation of the reactor, it is desirable to remove the operation of the reactor from the automatic control and transfer it to manual control, and to repair said circuit before returning to automatically controlled operation. Of the many malfunctions that may occur in the automatic circuit controlling the amount of reactivity in a reactor, one of these may occur in an ionization chamber circuit which includes a sensing element located within the active portion of the reactor. If the ionization chamber circuit should fail to produce a response or should produce a signal smaller than that which normally corresponds to the incident neutron radiation, the response of the remaining components of the automatic circuit would be to withdraw the control elements out of the active portion of the reactor to increase the reactivity of the reactor. As is well known in the neutronic reactor art, the control elements are usually made of steel having incorporated therein a material, such as boron, of high capture cross-section to absorb incident thermal neutrons thereby controlling the amount of neutrons available for fission process. The neutron absorber material is distributed uniformly in the mass of the control elements so that their linear dimensions bear a particular relationship to neutronic reactivity, which reactivity is usually expressed in percent, such as 0.001% per inch. The present control limiter has been constructed to limit the amount of movement of the control elements producing reactivity changes within the active portion of the reactor over any interval of time during a continuum of overlapping time periods. The control limiter functions not only to control the withdrawal of the control elements out of the active portion of the reactor, but also to control the insertion of the elements into the active portion, inasmuch as too rapid an insertion of the control elements into the reactor will bring about an undesirable shutdown of the reactor. The control limiter remains passive during normal automatic operation of the reactor until such time when the amount of reactivity introduced or removed by the control elements in the active portion of the reactor exceeds a predetermined magnitude averaged over any given interval of time during the entire period of reactor operation, at which time, the limiter will operate and transfer the control of the reactor from automatic to manual operation  The limiting action is accomplished by applying an output voltage (proportional to the speed of movement of the control element) to an R-C integrating network which is connected to a relay controlling the means actuating the control element. The network is arranged to discharge the charge developed by the voltage at a predetermined rate; however, if the voltage impressed across the network is higher than normal or is impressed for a longer period of time than normal, the amount of the stored charge would exceed a predetermined amount at which the relay would operate. In any case, the network continuously averages the output corresponding to the movement of the control rod during the entire operation and will function whenever the output reaches a predetermined magnitude over any time interval during the operating time.

The utilization of the control limiter to monitor the control effected by a control system used for controlling the operation of a controlled apparatus can be seen readily by referring to the simplified block diagram shown in Fig. 1. A control system 101 is utilized to maintain the operation of a controlled device 102 at a preset output level. The control system 101 comprises a control element 103, a sensing element 104 and a control circuit 105. The control element 103 regulates the amount of change in the operating condition of the controlled device 102, and the sensing element 104 generates an output corresponding to the amount of change in the operating condition of the controlled device 102, said output being transmitted to the control circuit 105 which transmits a regulating output to the control element 103 to maintain the condition of the controlled device 102 at a preset value. A portion of the regulating output transmitted by the control circuit 105 to the control element 103 is also transmitted to a control limiter 106. The control limiter 106 is adapted to integrate the received output over the entire period of time during which the device 102 is operated, and if said integrated output exceeds a preset value, the control limiter 106 impresses a signal (illustrated as a broken line) on the control circuit 105 to shut it off and at the same time transmits a signal to activate an alarm 107 to apprise an operator of the malfunction occurring in the control system 101.

A more specific embodiment of the present invention is illustrated in Fig. 2. The control limiter generally comprises a network 201, relays 202 and 203, and a terminal board 204 which is provided with terminals 1—12. The network 201 comprises resistors 207 and 208, a capacitor 210 an includes a coil 209 of the relay 202. The relay 202 is of the latch type which when energized will remain locked in one of its operated positions until released thereafter by an independent operation. A potentiometer 205 is connected across terminals 1 and 2 of the terminal board 204. An adjustable tap 206 on the potentiometer 205 is connected through the resistors 207, 208, and the coil 209 to terminal 2. The capacitor 210 is connected from the junction of the resistors 207 and 208 to terminal 2. The relay coil 209, as indicated previously, forms a part of the latch-type relay 202 which also comprises a meter 211 and a reset solenoid 212. The meter 211 has a pointer 213 which is capable of swinging between two extreme limits established by a pair of contacts 214 and 215, which have embedded therein a pair of small magnets 216 and 217, respectively, and a pair of reset fingers 218. Whenever the coil 209 is energized sufficiently to deflect the pointer 213 to one of its extreme positions, for example against the contact 214, the magnet 216 embedded in said contact will keep the pointer 213 in that deflected position until it is released by the reset solenoid 212 which is associated with a reset lever 220 operatively engaged (in a manner not shown) with the reset fingers 218. The manner of actuating the solenoid 212 to release the pointer 213 from one of its extreme positions by the reset mechanism will be described later. The contacts 214 and 215 are connected to terminal 4 on the terminal board 204. The pointer 213 is connected through the coil of the control relay 203 to terminal 3. A capacitor 222 shunts the control relay 203 to prevent sparking across the contacts 214 and 215 whenever the pointer 213 engages therewith. One end of the reset solenoid 212 is connected through a pair of normally open contacts 225 and 226 of a push-button switch 227 to terminal 3; the other end of the reset solenoid 212 is connected directly to terminal 4. The push-button switch 227 also possesses another pair of normally open contacts 229 and 230 which complete a circuit between terminal 2 and the junction of the resistors 207 and 208 whenever the switch 227 is actuated. The control relay 203 has associated therewith two pairs of normally open contacts 231 and 233 and two pairs of normally closed contacts 232 and 234. The normally opened contacts 231 are disposed in the circuit between terminals 5 and 7, and the normally open contacts 233 are disposed in the circuit between terminals 8 and 10. The normally closed contacts 232 are disposed in the circuit between terminals 6 and 7, and the normally closed contacts 234 are disposed in the circuit between terminals 9 and 10. The contacts 1 and 2 on the terminal board 204 are connected to an output voltage which corresponds to the movement of a control element, such as 103, and contacts 3 and 4 are connected to a 110 v. A.C. power source to supply energization for the various components comprising the control limiter. Contacts 5—10 are connected to an external circuit of conventional design, as described hereinafter, such as 105, which circuit cooperates with the relay 203 to effect either manual or automatic control over a controlled device, such as 102. Contacts 11 and 12 are connected to a conventional (remotely located) push-button switch identical to the switch 227 whereby the control limiter may be reset either from a local or a remote position.

The operating function of the control limiter may be better understood by referring to Fig. 3 which discloses an automatic control system utilizing the limiter for controlling the operation of a neutronic reactor. The automatic control system comprises an ionization chamber 302 situated within a neutronic reactor 303, a control amplifier 304, a drive circuit 305, a motor unit 307, a direct current power supply 308, and a control element or rod 309. The output of the ionization chamber 302 is fed into the control amplifier 304. Only a few components are shown in the amplifier 304 to simplify discussion on the operation of the control system, the circuits used in said amplifier being conventional. The control amplifier 304 comprises essentially a pair of amplifier tubes 311 and 312 which have their individual plates connected through relays 313 and 314, respectively, to a source of positive potential available at a terminal 316. The relays 313 and 314 have associated therewith individual normally-closed contacts 313–A and 314–A, respectively. These relays are usually energized during the control operation when the power output of the reactor 303 corresponds to the desired power setting; therefore, their respective contacts remain open during such period. A pair of power supply lines 317 and 318, being connectable to a source of alternating current, supply power to the automatic control system, said lines 317 and 318 being connected to terminals 3 and 4, respectively, of the terminal board 204. The drive circuit 305 comprises a pair of relay coils 319 and 320, a pair of push-button switches 322 and 323, a transformer 324, and a pair of pilot lights 325 and 326. The transformer 324 has a primary winding 327 connected across the supply lines 317 and 318, and a secondary winding 328 having one end connected to one side of both of the pilot lamps 325 and 326 and the other end thereof connected to terminal 10 on the terminal board 204. The end of the secondary winding 328 which is connected to the pilot lamps 325 and 326 is also grounded. The ungrounded sides of the pilot lamps 325 and 326 are connected to terminals 9 and 8, respectively. The transformer 324 steps down the supply voltage to a lower voltage to supply energization for the pilot lamps 325 and 326. The relay coil 319, which has associated therewith contacts 319–A and 319–B, has one end connected to one side of the push-button switch 322 and also to one side of the contacts 313–A, the other side of said switch being connected to terminal 5 and the other side of the contacts 313–A being connected to terminal 6. The other end of the relay coil 319 is connected to the line 318. The relay coil 320, which has associated therewith contacts 320–A and 320–B, is connected from the supply line 318 to one side of the switch 323 and also to one side of the contacts 314–A. The other side of the switch 323 is connected to terminal 5 and the other side of the contacts 314–A is connected to terminal 6.

A reset push-button switch 329 has two pairs of normally open contacts 331 and 334, 332 and 333, wherein the contacts 331 and 334 are adapted to establish a circuit between terminals 2 and 11, and the contacts 332 and 333 are adapted to establish a circuit between terminals 3 and 12. The motor unit 307 comprises an armature 335 in contact with two brushes 336 and 337, and a field 338 having terminals 339 and 340. The contacts 319–A are disposed in the circuit between the brush 336 and the positive terminal on the power supply 308 and the contacts 320–A are disposed in the circuit between said brush and the negative terminal on the power supply. Similarly, the contacts 319–B are disposed in the circuit between the brush 337 and the negative terminal on the power supply 308 and the contacts 320–B are disposed in the circuit between said brush and the positive terminal on the power supply.

The terminal 339 of the field winding 338 is connected to the positive terminal and the other terminal 340 of said field is connected to the negative terminal on the power supply 308. The power supply 308 is connected to the power supply lines 317 and 318 by means of an auto-transformer 342. The autotransformer 342 has an adjustable tap 343 for adjusting the input voltage to a desired magnitude. The armature 335 is coupled through a mechanical linkage to a pinion 344 which is operatively engaged with the rack 309, said rack being also the control element controlling the reactivity in the reactor 303. As is evident from Fig. 3, the brushes 336 and 337 are connectable through relay contacts 319–A, 319–B, 320–A and 320–B to either the positive or negative terminals on the power supply 308 thereby permitting a forward and reverse operation of the motor unit 307. The field winding 338 is energized at all times during reactor operation, whether the armature 335 is rotating or not. The switches 322 and 323 enable an operator to control manually the movement of the control element 309 with respect to the reactor 303, wherein the closure of the contacts on the "IN" switch 322 will cause an insertion of the rod 309 into the reactor 303 and the closure of the contacts associated with the "Out" switch 323 will cause said control element to be withdrawn out of said reactor. Whenever the automatic control system is in operation, the pilot light 325 is illuminated to indicate "Auto" operation of the reactor 303, and whenever the automatic control system is made inoperative so that manual control is required, the illumination of the pilot light 326 will indicate "Manual" operation. The rack or control element 309 is made of reactivity varying material, such as boron steel, cadmium, or uranium–235, for affecting the amount of neutron generation within the active portion of the reactor 303. The rack 309 (control rod) is similar to the control rod 32 shown in Fig. 20 of the previously cited Fermi et al. patent.

*Method of operation*

Before going into a detailed description of the operation of the control system shown in Fig. 3, it is appropriate to indicate generally the mode of operation. The type of control system presented thus far is a fixed speed step-type encountered in discontinuous-type servomechanisms. The control system responds to variations in the nuclear flux developed within the reactor 303 by applying a drive voltage across the armature 335 in a discontinuous manner. The armature voltage is assumed to be instantaneous with the application of full line voltage from the power supply 308. A graphic record of the power voltage impressed across the armature 335 during normal operation would disclose a series of approximately square pulses having practically the same magnitude but varying in time duration.

Assuming that the reactor 303 is operating properly at the desired power level, the condition of the control system will be as indicated in Fig. 3. The current which is developed within the ionization chamber 302, corresponding to the neutron intensity within the active portion of the reactor 303, is transmitted to the control amplifier 304 and if the amount of the control element 309 within the reactor 303 corresponds to a correct setting of the desired power output of the reactor 303, both of the tubes 311 and 312 within the control amplifier 304 will be in conductive state thereby having their individually associated relays 313 and 314 in the energized state. As a result, the contacts 313–A and 314–A associated with said relays will remain open. Since the contacts 313–A and 314–A are open, the relays 319 and 320 will remain unoperated and their associated contacts 319–A and 319–B, 320–A and 320–B will remain open to thereby apply no power from the power supply 308 to the armature 335. During this period of desired power output of the reactor 303, there is no voltage impressed across the armature 335 and therefore no voltage is impressed across the potentiometer 205 by way of terminals 1 and 2. During the period of automatic control exerted by the control system, the pilot light 325 is energized from the secondary winding 328, through terminal 9, contacts 234, and terminal 10.

If a change occurs in neutron flux within the reactor 303, for example due to a fuel depletion or a temperature variation, the change in the current generated in the ionization chamber 302 will affect the control amplifier 304 and the balanced condition existing therein to thereby de-energize one of the relays in said amplifier. Assuming for the moment that decreased reactivity in the reactor 303 will cause one of the tubes, such as tube 312, to be cut off, the relay 314 will become de-energized and the contacts 314–A associated with said relay will close a circuit to operate the relay 320, said circuit extending from the voltage supply line 318 through contacts 314–A, terminal 6, contacts 232, and terminal 7 to the supply line 317. The operation of the relay 320 is indicated by "OUT" signifying thereby that whenever this relay is operated, the motor unit 307 will operate in such a manner as to cause the pinion 344 to drive the rack 309 out of the reactor 303. The contacts 320–A and 320–B associated with the relay 320 will close and impress a voltage, available at the positive and negative terminals of the power supply 308, across the armature 335. As a result, the armature 335 will rotate in such a manner as to drive the pinion 344 to withdraw the rack 309 from the reactor 303 thereby increasing the generation of neutrons within the active portion of said reactor. After the control element 309 has been withdrawn sufficiently to bring the power output of the reactor back to its original preset value, the change in neutron generation will be reflected in a change in current in the ionization chamber 302 to affect the control amplifier 304 wherein the relay 314 will become energized again to effect the removal of power from the armature 335 thereby immobilizing the control rod 309.

Should the amount of reactivity within the reactor 303 increase because of internal changes, the change in the condition in the reactor 303 would affect the control amplifier 304 to de-energize relay 313 which would cause the motor unit 307 to insert the rod 309 into the reactor 303 to decrease the generation of the neutrons. The operation of the drive circuit 305 for inserting the rod 309 to decrease neutron generation within the reactor 303 is fairly obvious from the circuit diagram and will not be discussed. As is evident in the circuit diagram (Fig. 3), the motor unit 307 is energized by the voltage supplied by the power supply 308. Since the motor field 338 is energized at all times, application of a full-line output voltage across the armature 335 results in immediate response of the motor since no delay is experienced in building up an electromagnetic field in the motor field.

During the time that the motor unit 307 is operated, the voltage that is impressed across the armature 335 is integrated in the integrating circuit 201. During this period, the capacitor 210 will store up a charge, the rate of such storage being controlled by the resistors 207 and 208 together with the coil 209. If the automatic control system functions properly, the motor unit 307 will operate for only a short period of time to move the control element 309 and then shut off, with the result that the voltage developed across the potentiometer 205 and the network 201 will never be sufficient to operate the latch relay 202.

Assuming for the moment that a malfunction, such as an open circuit, has occurred in the ionization chamber 302 or in the control amplifier 304, the automatic control system will function abnormally and one of the relays contained in the control amplifier 304, such as relay 314, for example, will be released. The de-energization of relay 314 will result in the automatic control system operating in such a manner as to withdraw the control element 309 out of the reactor 303, as discussed hereinbefore. As a result of the malfunctioning of one or both of the circuits previously indicated, the change of condition created by the withdrawal of the control element 309 will not be reflected correctly in the control amplifier 304 with the result that the motor unit 307 will continue to withdraw the control element 309 for an abnormal period of time. As a result, a voltage is impressed across the network 201 for a longer duration of time than normal thereby allowing the capacitor 210 to charge up to a magnitude sufficient to energize the latch relay 202 through its coil 209. The pointer 213 will be attracted to one of the contacts limiting its deflection, such as contact 214. The pointer 213 then will be held firmly in contact with the contact 214 by means of the magnet 216 embedded therein. The energization circuit of relay 203 is established from the supply line 317 at terminal 3, the connection existing between the pointer 213 and the contact 214 to the other supply line 318 at terminal 4. The relay 203 will operate and open its contacts 232 and 234 to thereby open the circuit loops existing between terminals 6 and 7 and terminals 9 and 10, respectively, the opening of the first pair of aforesaid contacts being responsible for shutting down the drive circuit 305 by de-energizing the relay 320 (or relay 319, as the case may be) which is connected to terminal 6. The opening of the contacts 234 is responsible for opening the energization circuit supplying power to the pilot light 325. The de-energization of relay 320 will result in opening of the contacts 320–A and 320–B associated therewith to thereby open the power circuit to the armature 325, hence preventing further withdrawal of the control element 309 out of the reactor 303. Simultaneously, the contacts 231 and 233 will be closed, wherein the contacts 231 will close a circuit extending from line 317, terminal 7, and terminal 5, thereby making available a source of power at one set of contacts on the switches 322 and 323; and the closure of contacts 233 will establish a circuit from one end of the secondary winding 328, terminal 10, terminal 8, and the filament of "Manual" pilot light 326 to the other end of the secondary winding 328. Illumination of the pilot light 326 will alert the operator that the automatic control system has been made inoperative and that the operation of the reactor has been switched to manual control.

Since the automatic control system has been made inoperative, the operator is capable of continuing the operation of the reactor 303 by controlling the amount of movement of the control element 309 by means of the "Manual" control switches 322 and 323. The operation of the switch 323 will energize the relay 320, which is associated with the "Out" movement of the control element 309, and similarly, the operation of the switch 322 will energize the relay 319, which is associated with the "In" movement of the control element 309.

Assuming that the cause of trouble has been found and removed, the control limiter can be reset to take again the control over the operation of the reactor 303. The control limiter may be reset from two position, either by operating the push-button switch 227 located in the vicinity of the limiter or by operating the remote push-button switch 329 located at the site of the reactor 303. For example, if the push button 227 is depressed momentarily, a circuit will be established by means of the contacts 229 and 230 between the junction of the resistors 207 and 208 and terminal 2 with the result that any charge stored on the capacitor 210 will be discharged and the contacts 225 and 226 will establish an energized circuit from the supply line 317 at terminal 3, through the reset solenoid 212 to the other supply line 318 at terminal 4. The reset solenoid 212 will actuate the reset lever 220 which in turn snaps together (not shown) the reset fingers 218 to thereby release the pointer 213 and bring it back to its mid-position on the meter 211. The release of the pointer 213 to its mid-position will result in breaking the connection existing between the pointer 213 and the contact 214 thereby de-energizing the relay 203. As a result of the de-energization of the relay 203, the normally open contacts 231 and 233 will open and the normally closed contacts 232 and 234 will close to thereby supply power to the drive circuit 305 via terminals 5—10, as previously discussed. Now, the drive circuit 305 takes over the actuation of the motor unit 307 and associated equipment. The remote push-button switch 329 which is connected in parallel across the push-button switch 227 has a similar function to the latter, namely to discharge any leftover charge stored on the capacitor 210 and to reset the latch relay 202.

The control limiter has been designed to give a long uninterrupted maintenance-free service for controlling the operation of neutronic reactors utilizing control elements. The control element 309 is made to move at a certain speed so that a certain percent of reactivity variation is effected for every predetermined period of running of the motor unit 307. The values of the various components used in the particular construction of the control device, which is being discussed presently, will be indicated later on. As was stated before, the movement of the control element 309 is related to the period of time during which a voltage, available at the power supply 308, is impressed across the armature 335, said voltage being also impressed across the potentiometer 205 and the network 201 of the control limiter. As is shown in Fig. 2, the resistors 207 and 208 combine together with the capacitor 210 to give a particular time constant to the network 201. The deflection of the pointer 213 on the latch relay 202 is proportional to the voltage developed across the capacitor 210, and the magnetic flux developed by the coil 209 will attract the pointer 213 so that it will establish a connection with the relay contacts 214 and 215 whenever the voltage on the capacitor 210 exceeds a predetermined magnitude. As was indicated before, the voltage available at the output terminals of the D.C. power supply 308 can be adjusted by adjusting the input into said power supply by means of the tap 343 on the autotransformer 342. There is, however, a limitation as to how low the voltage output can be made and still not affect adversely the operation of the control limiter. If the voltage impressed across the armature 335 and the potentiometer 205 is too low, the network 201 in the control limiter will not function properly because it will not have the ability to store a sufficient charge on the capacitor 210, the magnitudes of the components comprising the network 201 being too high to store a charge on the capacitor 210 sufficient to operate the relay 202 even with the motor 307 running constantly. It has been found from experience, in the particular device described hereinbefore, that it was necessary to operate the motor unit 307 at a speed not lower than one-third of the normal rated speed for said motor unit. After a determination has been made as to the proper operating speed for the motor unit 307, additional adjustment in the operation of the control limiter can be obtained by varying the position of the contact 206 on the potentiometer 205. The control limiter is designed to give an operation over a speed range of 3:1 without any readjustment of controls with the components hereinafter described. The speed range may be centered about any selected nominal speed by adjusting the voltage applied to the network 201, by varying the change in time constant of the following components in the relationship $$\frac{(207)\ (208)\ (210)}{(207)+(208)}$$

or by varying the sensitivity of the latch relay 202. The discharging and the charging time constants are both equal to the value given in the formula above, neglecting the resistance of the coil 209 and the resistor 205. The effect of using the resistor 208 in series with the coil 209 across the capacitor 210 is to decrease the time constant to one-half of that which would be present if only the resistor 207 were used in conjunction with the capacitor 210.

An embodiment of the invention used with a modified control circuit is disclosed in Fig. 4 wherein, in order to facilitate the understanding of the modification of the automatic control system, a portion of the automatic control circuit, namely the armature 335 with its associated brushes 336 and 337, and the pinion 344, is shown. As shown in the first modification (Fig. 3) the voltage which is impressed across the armature 335 is also connected through terminals 1 and 2 to the control limiter. It may be desirable, however, for a particular application to use an independent voltage source in conjunction with the control limiter. For example, in Fig. 4, a voltage source 401, such as a tachometer, is mechanically coupled to the armature 335. The source 401, whenever actuated, develops a voltage output across its leads 402 and 403, which output is proportional to the speed of movement of the control element 309. In the instant discussion, this is assumed because the speeds of movement of control element 309 and the armature of voltage source 401 are proportional to the velocity of the armature 335. The leads 402 and 403 of the tachometer are connected to leads 346 and 347 which previously have been disconnected from the brushes 336 and 337. Therefore, the voltage output of the source 401 is impressed through terminals 1 and 2 across the potentiometer 205 of the control limiter to actuate the integrating network in the manner described in reference to Figs. 2 and 3.

Although in the present embodiments of the invention only the discontinuous type control system has been described, it is apparent to those skilled in the art, that other types of control systems may be used with the control limiter. As an example, a smoothly varying type control system may be used wherein a voltage is continually impressed across the armature 335, said voltage, however, varying in magnitude which corresponds to the magnitude of neutron changes in the reactor 303.

The values of the various components used in the limiter device described hereinbefore are set out in the table below:

Potentiometer 205 _____ohms__ 5000
Resistor 207 _____do____ 193,000
Resistor 208 _____do____ 193,000

| | |
|---|---|
| Capacitor 210 _____ mfd__ | 132 |
| Capacitor 222 _____ mfd__ | 0.1 |

Hereinbefore described are two embodiments of the invention. It will be understood that various other modifications and embodiments may be made and therefore it is intended to be bound only by the limitations of the appended claims.

What is claimed is:

1. In an automatic control system for a nuclear reactor having a control element, a device for limiting the amount of control over said control element comprising a sensing element disposed within the neutronic reactor and having an output proportional to the neutron flux therein, an amplifier connected to the output of the sensing element and responsive thereto, a drive circuit coupled to the amplifier and controllable thereby, a motor connected to the control element and adapted to move the control element within the neutronic reactor, a source of power for driving said motor, said drive circuit energizable to connect said power supply to said motor, a voltage integrator connectable to the source of power and fed thereby when the motor is driven by the source of power, a latch relay connected to the output of the voltage integrator and operable thereby, and means controllable by the latch relay to deenergize the drive circuit and disconnect the source of power from the motor when the output of the voltage integrator exceeds a predetermined value.

2. In an automatic control system for regulating the reactivity of a neutron-producing apparatus comprising a nuclear reactor including an active portion wherein neutrons are released to generate a neutron flux, an element of reactivity-varying material disposed within the active portion of the reactor for controlling the release of neutrons therein, means coupled to the control element for the movement thereof within the active portion of the reactor to maintain the neutron flux therein at a preset value, an element disposed within the active portion of the reactor for sensing the magnitude of the neutron flux therein and producing an output proportional thereto, an amplifier circuit connected to the output of the sensing element and producing an output proportional thereto, and a drive circuit connected to the output of the amplifier circuit and coupled to the movement means, the drive circuit producing an output in response to the output of the amplifier circuit and the movement means being responsive thereto, the improvement wherein there is provided a circuit connected to the output of the drive circuit for integrating the output thereof over a continuum of overlapping periods of time and producing an output proportional thereto, the integrating circuit further being coupled to the drive circuit to render the drive circuit inoperative in response to the receipt of a preset output from the drive circuit during a preset time interval over a continuum of overlapping periods of time.

3. In an automatic control system for a nuclear reactor having a control element, a device for limiting the amount of control over said control element comprising a sensing element disposed within the nuclear reactor and having an output proportional to the neutron flux therein, an amplifier connected to the output of the sensing element and responsive thereto, a drive circuit coupled to the amplifier and controllable thereby, a motor connected to the control element and adapted to move the control element within the nuclear reactor, a source of power for driving said motor, said drive circuit energizable to connect said power supply to said motor, a tachometer mechanically coupled to said motor, a voltage integrator connected to the output of said tachometer, a latch relay connected to the output of the voltage integrator and operable thereby, and means controllable by the latch relay to deenergize the drive circuit and disconnect the source of power from the motor when the output of the voltage integrator exceeds a predetermined value.

References Cited in the file of this patent

UNITED STATES PATENTS

| | | |
|---|---|---|
| 2,537,427 | Seid et al. _____ | Jan. 9, 1951 |
| 2,644,642 | Smoot _____ | July 7, 1953 |
| 2,679,022 | McIlhenny _____ | May 18, 1954 |
| 2,691,122 | Moag _____ | Oct. 5, 1954 |
| 2,734,155 | Schuck _____ | Feb. 7, 1956 |
| 2,784,353 | Holmes _____ | Mar. 5, 1957 |
| 2,820,753 | Miller et al. _____ | Jan. 21, 1958 |
| 2,842,720 | Huston _____ | July 8, 1958 |

OTHER REFERENCES

AECD–4209, Atomic Energy Commission document, dated March 29, 1949, pages 2–8.

"Principles of Nuclear Reactor Engineering," by Samuel Glasstone. D. Van Nostrand Co., N.Y., 1st edition, July 1955, 2nd printing November 1955, pages 322–324, 333–350, 353–358.